United States Patent
Song

(10) Patent No.: US 11,954,136 B2
(45) Date of Patent: Apr. 9, 2024

(54) METHOD AND APPARATUS FOR MULTI-VIEW CONVERSATIONAL QUERY PRODUCTION

(71) Applicant: TENCENT AMERICA LLC, Palo Alto, CA (US)

(72) Inventor: Linfeng Song, Bellevue, WA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/898,867

(22) Filed: Aug. 30, 2022

(65) Prior Publication Data

US 2024/0070179 A1   Feb. 29, 2024

(51) Int. Cl.
  *G06F 16/00* (2019.01)
  *G06F 16/332* (2019.01)
  *G06N 5/02* (2023.01)

(52) U.S. Cl.
  CPC ...... *G06F 16/3329* (2019.01); *G06F 16/3322* (2019.01); *G06N 5/02* (2013.01)

(58) Field of Classification Search
  CPC .................................................. G06F 16/3329
  See application file for complete search history.

(56) References Cited

U.S. PATENT DOCUMENTS

| | | |
|---|---|---|
| 2009/0006294 A1 | 1/2009 | Liu et al. |
| 2009/0055176 A1 | 2/2009 | Hu et al. |
| 2011/0047120 A1 | 2/2011 | Kamvar et al. |
| 2017/0004132 A1 | 1/2017 | Sharifi |
| 2017/0031958 A1* | 2/2017 | Miller ............... G06F 16/2423 |
| 2019/0066031 A1* | 2/2019 | Hancock .............. G06N 5/04 |
| 2020/0135174 A1 | 4/2020 | Cui et al. |

OTHER PUBLICATIONS

Vaibhav Kumar et al., "Making Information Seeking Easier: An Improved Pipeline for Conversational Search", Findings of the Association for Computational Linguistics: EMNLP, 2020, pp. 3971-3980 (10 pages total).
International Search Report dated Jun. 15, 2023 in International Application No. PCT/US2023/016030.
Written Opinion dated Jun. 15, 2023 in International Application No. PCT/US2023/016030.

* cited by examiner

*Primary Examiner* — Ajith Jacob
(74) *Attorney, Agent, or Firm* — Sughrue Mion, PLLC

(57) ABSTRACT

A method of training a model for query generation, the method performed by at least one processor and including receiving a training instance query corresponding to a dialogue history. The method further including generating a first static view of the model based on a number of common words between the training instance query and the dialogue history. The method further including generating a second static view of the model based on one or more tokens not covered by the dialogue history, the one or more tokens corresponding to one or more query words. The method further including generating a dynamic view of the model based on a score operation that compares a candidate query generated from the model with a target query. The method further including training the model based at least on the first static view, the second static view, and the dynamic view.

17 Claims, 5 Drawing Sheets

METHOD AND APPARATUS FOR MULTI-VIEW CONVERSATIONAL QUERY PRODUCTION

TECHNICAL FIELD

The present disclosure relates generally to query generation, and more particularly to methods and apparatuses for multi-view conversational query production.

BACKGROUND

Conversational query generation aims at producing search queries from dialogue histories to reflect the next dialogue topic, where the queries are typically used to retrieve relevant knowledge from a knowledge source (e.g., a search engine) to help knowledge-based dialogue systems. Leveraging external knowledge has been proven to be important for dialogue response generation. Following this line of research, exploring the internet as external knowledge is gaining popularity because of its continually updated content and coverage on a variety of domains. To retrieve useful knowledge from the web, the task of query production is proposed to assemble search queries from dialogue contexts for effectively interacting with a search engine. This task is crucial because the quality of generated queries directly affects the relatedness of retrieved knowledge to current dialogue contexts.

The current efforts consider query production as a typical text-to-text generation problem and adopt the Transformer architecture as the backbone to build query producers. As a common practice, a pre-trained encoder-decoder model may be adopted, such as BART [2] or T5 [3], and further fine-tuned on an annotated query generation data set with standard cross-entropy (CE) loss.

Trained to perfectly generate the gold queries, previous models face faithfulness (e.g., accuracy) and data hunger (e.g., data amount) issues, where these models require a large amount of training data, and the produced queries at inference time are likely to miss important concepts from dialogue contexts. High variations in annotated gold queries are a main cause to these issues. Improvements are presented herein to alleviate these issues.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Methods, apparatuses, and non-transitory computer-readable mediums for multi-view query production.

According to an exemplary embodiment a method of training a model for query generation, where the method is performed by at least one processor, includes receiving a training instance query corresponding to a dialogue history. The method further includes generating a first static view of the model based on a number of common words between the training instance query and the dialogue history. The method further includes generating a second static view of the model based on one or more tokens not covered by the dialogue history, the one or more tokens corresponding to one or more query words. The method further includes generating a dynamic view of the model based on a score operation that compares a candidate query generated from the model with a target query. The method further includes training the model based at least on the first static view, the second static view, and the dynamic view.

According to an exemplary embodiment, a device for training a model for query generation includes at least one memory configured to store computer program code, and at least one processor configured to access said at least one memory and operate as instructed by said computer program code. The computer program code includes receiving code configured to cause at least one of said at least one processor to receive a training instance query corresponding to a dialogue history. The computer program code further includes first generating code configured to cause at least one of said at least one processor to generate a first static view of the model based on a number of common words between the training instance query and the dialogue history. The computer program code further includes second generating code configured to cause at least one of said at least one processor to generate a second static view of the model based on one or more tokens not covered by the dialogue history, the one or more tokens corresponding to one or more query words. The computer program code further includes third generating code configured to cause at least one of said at least one processor to generate a dynamic view of the model based on a score operation that compares a candidate query generated from the model with a target query. The computer program code further includes training code configured to cause at least one of said at least one processor to train the model based at least on the first static view, the second static view, and the dynamic view.

According to an exemplary embodiment, a non-transitory computer readable medium having instructions stored therein, which when executed by a processor cause the processor to execute a method of training a model for query generation. The method includes receiving a training instance query corresponding to a dialogue history. The method further includes generating a first static view of the model based on a number of common words between the training instance query and the dialogue history. The method further includes generating a second static view of the model based on one or more tokens not covered by the dialogue history, the one or more tokens corresponding to one or more query words. The method further includes generating a dynamic view of the model based on a score operation that compares a candidate query generated from the model with a target query. The method further includes training the model based at least on the first static view, the second static view, and the dynamic view.

Additional embodiments will be set forth in the description that follows and, in part, will be apparent from the description, and/or may be learned by practice of the presented embodiments of the disclosure.

BRIEF DESCRIPTION OF THE DRAWINGS

The above and other aspects, features, and aspects of embodiments of the disclosure will be apparent from the following description taken in conjunction with the accompanying drawings, in which.

DETAILED DESCRIPTION

Figure 1:
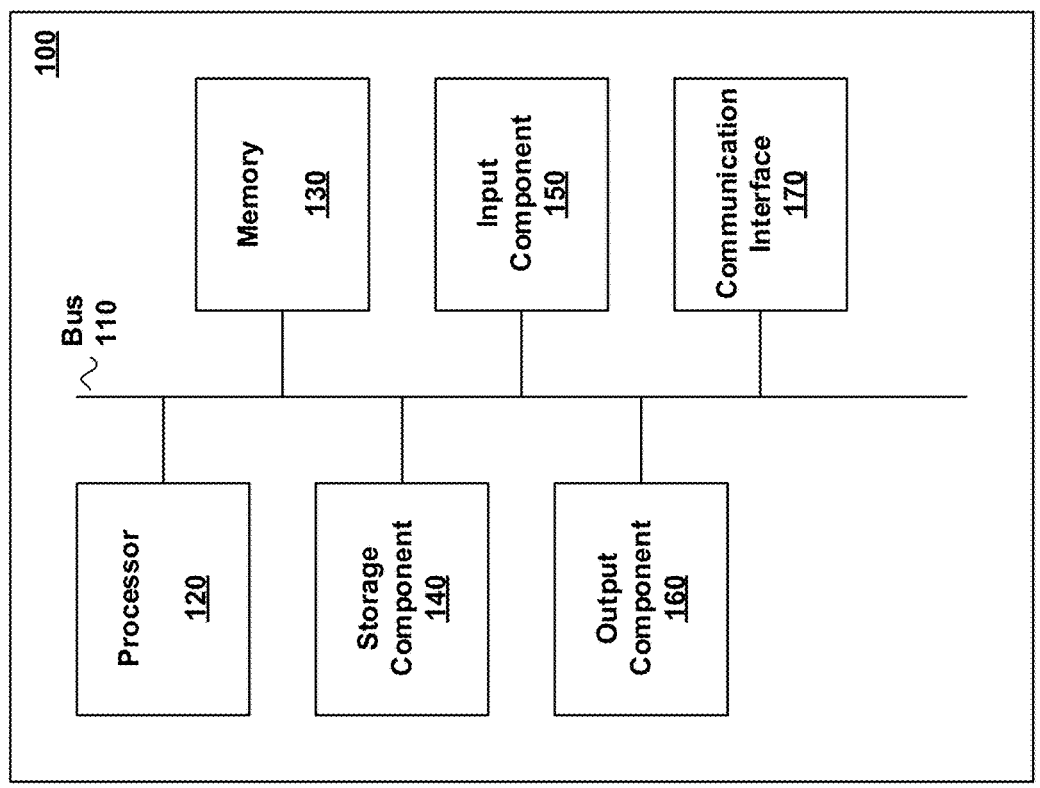
FIG. 1 is a diagram of an example network device, in accordance with various embodiments of the present disclosure.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

Embodiments of the present disclosure are directed to a query generation model training system framework that contains multiple static and dynamic views to highlight the main content of each training query and alleviate the side effects of annotation variations. Under this framework, a query generation model may reconstruct the query as well as the views. In some embodiments, the losses for reconstructing the views are back-propagated to the whole model so that the model can better retain the main content. In some embodiments, the training process contains pre-training and fine tuning stages, where static views may be used during pre-training, and dynamic views are adopted during fine tuning. The embodiments of the present disclosure are model agnostic and can work with any Seq2Seq model.

In some embodiments, the static views consider the overlap between each annotated query and the corresponding dialogue context as the main content. In this regard, the query and the dialogue context are "static" during training. One static view may be formed by applying a 0-1 soft mask to each training instance, and the value may be based on how much content of the training instance is covered by the dialogue context. Another static view may capture finer-grain correlations by converting tokens that are not covered by the dialogue context into a predefined "[MASK]" token.

In some embodiments, a dynamic view may be generated by sampling outputs from the model distribution, and therefore, are "dynamic" during training. Since the dynamic view may contain errors, a "reinforcement with a baseline" may be adopted to update the model based on this view, where the reward comes from comparing this view to the annotated query. Comparatively, the static views mitigate the inconsistency between human annotations and dialogue contexts, and the dynamic view mitigates the inconsistency between human annotations and model distribution.

Experiments on two benchmarks of different languages show that the model trained by the multi-view framework generates more faithful (e.g., accurate) queries than the baseline trained only with CE loss. Furthermore, the model trained by the multi-view framework also significantly outperform the baseline regarding both human evaluation and automatic metrics, such as Unigram F1 and BLEU-1/2. Further evaluation in low-resource settings shows that the model using just 1K training instances reaches comparable performances with the baseline trained with the whole 42K training instances.

FIG. 1 is diagram of an example device for performing translation services. Device 100 may correspond to any type of known computer, server, or data processing device. For example, the device 100 may comprise a processor, a personal computer (PC), a printed circuit board (PCB) comprising a computing device, a mini-computer, a mainframe computer, a microcomputer, a telephonic computing device, a wired/wireless computing device (e.g., a smartphone, a personal digital assistant (PDA)), a laptop, a tablet, a smart device, or any other similar operating device.

In some embodiments, as shown in FIG. 1, the device 100 may include a set of components, such as a processor 120, a memory 130, a storage component 140, an input component 150, an output component 160, and a communication interface 170.

The bus 110 may comprise one or more components that permit communication among the set of components of the device 100. For example, the bus 110 may be a communication bus, a cross-over bar, a network, or the like. Although the bus 110 is depicted as a single line in FIG. 1, the bus 110 may be implemented using multiple (two or more) connections between the set of components of device 100. The disclosure is not limited in this regard.

The device 100 may comprise one or more processors, such as the processor 120. The processor 120 may be implemented in hardware, firmware, and/or a combination of hardware and software. For example, the processor 120 may comprise a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), a general purpose single-chip or multi-chip processor, or other programmable logic device, discrete gate or transistor logic, discrete hardware components, or any combination thereof designed to perform the operations described herein. A general purpose processor may be a microprocessor, or any conventional processor, controller, microcontroller, or state machine. The processor 120 also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given operation.

The processor 120 may control overall operation of the device 100 and/or of the set of components of device 100 (e.g., the memory 130, the storage component 140, the input component 150, the output component 160, the communication interface 170).

The device 100 may further comprise the memory 130. In some embodiments, the memory 130 may comprise a random access memory (RAM), a read only memory (ROM), an electrically erasable programmable ROM (EEPROM), a flash memory, a magnetic memory, an optical memory, and/or another type of dynamic or static storage device. The memory 130 may store information and/or instructions for use (e.g., execution) by the processor 120.

The storage component 140 of device 100 may store information and/or computer-readable instructions and/or code related to the operation and use of the device 100. For example, the storage component 140 may include a hard disk (e.g., a magnetic disk, an optical disk, a magneto-optic disk, and/or a solid state disk), a compact disc (CD), a digital versatile disc (DVD), a universal serial bus (USB) flash drive, a Personal Computer Memory Card International Association (PCMCIA) card, a floppy disk, a cartridge, a magnetic tape, and/or another type of non-transitory computer-readable medium, along with a corresponding drive.

The device 100 may further comprise the input component 150. The input component 150 may include one or more components that permit the device 100 to receive information, such as via user input (e.g., a touch screen, a keyboard, a keypad, a mouse, a stylus, a button, a switch, a microphone, a camera, and the like). Alternatively or additionally, the input component 150 may include a sensor for sensing information (e.g., a global positioning system (GPS) component, an accelerometer, a gyroscope, an actuator, and the like).

The output component 160 of device 100 may include one or more components that may provide output information from the device 100 (e.g., a display, a liquid crystal display (LCD), light-emitting diodes (LEDs), organic light emitting diodes (OLEDs), a haptic feedback device, a speaker, and the like).

The device 100 may further comprise the communication interface 170. The communication interface 170 may include a receiver component, a transmitter component, and/or a transceiver component. The communication interface 170 may enable the device 100 to establish connections and/or transfer communications with other devices (e.g., a server, another device). The communications may be effected via a wired connection, a wireless connection, or a combination of wired and wireless connections. The communication interface 170 may permit the device 100 to receive information from another device and/or provide information to another device. In some embodiments, the communication interface 170 may provide for communications with another device via a network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, a long-term evolution (LTE) network, a third generation (3G) network, a code division multiple access (CDMA) network, and the like), a public land mobile network (PLMN), a telephone network (e.g., the Public Switched Telephone Network (PSTN)), or the like, and/or a combination of these or other types of networks. Alternatively or additionally, the communication interface 170 may provide for communications with another device via a device-to-device (D2D) communication link, such as FlashLinQ, WiMedia, Bluetooth, ZigBee, Wi-Fi, LTE, 5G, and the like. In other embodiments, the communication interface 170 may include an Ethernet interface, an optical interface, a coaxial interface, an infrared interface, a radio frequency (RF) interface, or the like.

The device 100 may be included in the core network 240 and perform one or more processes described herein. The device 100 may perform operations based on the processor 120 executing computer-readable instructions and/or code that may be stored by a non-transitory computer-readable medium, such as the memory 130 and/or the storage component 140. A computer-readable medium may refer to a non-transitory memory device. A memory device may include memory space within a single physical storage device and/or memory space spread across multiple physical storage devices.

Computer-readable instructions and/or code may be read into the memory 130 and/or the storage component 140 from another computer-readable medium or from another device via the communication interface 170. The computer-readable instructions and/or code stored in the memory 130 and/or storage component 140, if or when executed by the processor 120, may cause the device 100 to perform one or more processes described herein.

Alternatively or additionally, hardwired circuitry may be used in place of or in combination with software instructions to perform one or more processes described herein. Thus, embodiments described herein are not limited to any specific combination of hardware circuitry and software.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Additionally or alternatively, a set of (one or more) components shown in FIG. 1 may perform one or more operations described as being performed by another set of components shown in FIG. 1.

Figure 2:
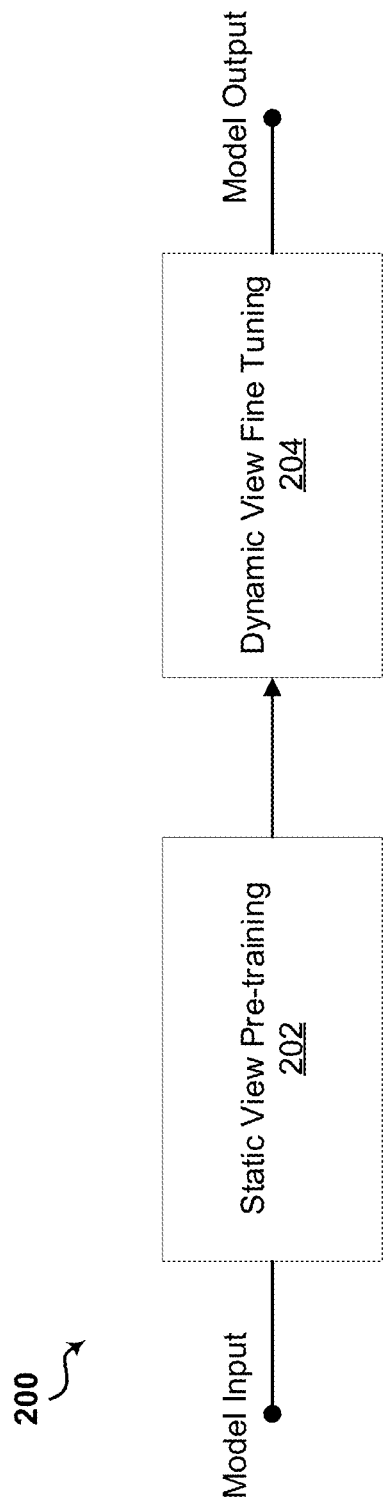
FIG. 2 is a block diagram of a query generation model training system, in accordance with various embodiments of the present disclosure.

FIG. 2 is block diagram of a view of the query generation model system 200 that includes a static view pre-training stage 202 and a dynamic view fine tuning stage 204. The model may be input into the static view pre-training stage 202. After static view pre-training is performed, the model may be input into the dynamic view fine tuning stage 204.

Figure 3:
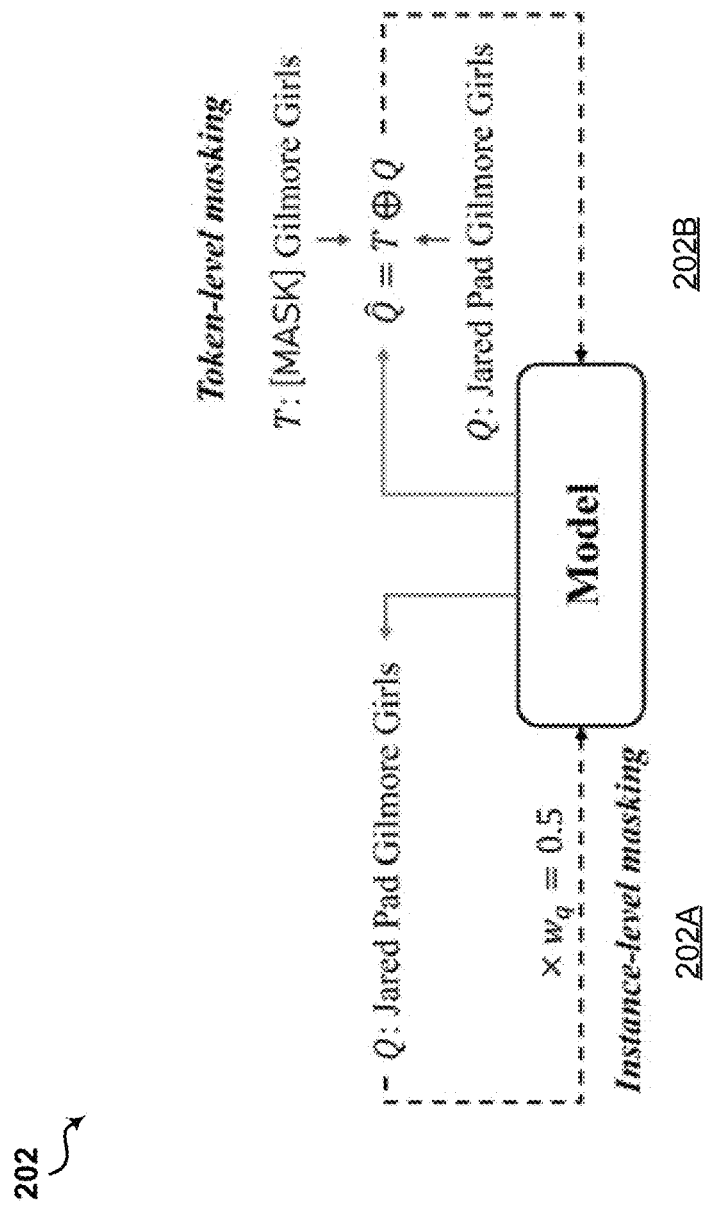
FIG. 3 is a block diagram of static view pre-training of the query generation model, in accordance with various embodiments of the present disclosure.

FIG. 3 illustrates an embodiment of the static view pre-training stage 202, which may apply different masking strategies at various granularities to enhance a model's ability to be faithful to the dialogue context (e.g., accurate query with respect to dialogue context). In FIG. 3, the solid line may denote a forward pass, and the dotted line may denote a backward pass. The symbol Q may refer to the gold query. The symbol T may refer to an automatically generated template by token-level masking. The symbol C* may indicate a generated candidate. The symbol ⊕ may represent a concatenation operation.

In some embodiments, the static view pre-training stage 202 includes an instance-level masking operation 202A that may apply a 0-1 scaling value to each training instance. The scaling value may be decided by a degree of faithfulness (e.g., degree of accuracy) for each training instance. The degree of faithfulness may be measured by the number of common words between the query Q and the dialogue history H. The scaling value $w_q$ may be defined as follows:

$$w_q = \begin{cases} \dfrac{\min(d, \alpha)}{\alpha} & \text{if } 0 < \alpha \le 1 \\ 1_{d>0} & \text{if } \alpha = 0 \end{cases} \quad \text{Eq. (1)}$$

In Eq. 1, $1_{cnd}$ may represent an indicator operation that returns 1 or 0 based on whether condition cnd is true, d may represent a faithfulness degree, and α may represent a hyper-parameter determining the minimum degree of faithfulness required to be free from penalty. As an example, given a specific value of faithfulness degree (e.g., d=0.1), a larger a (e.g., 1.0 vs 0.5) denotes a smaller scaling value $w_q$ (0.1 vs 0.2), indicating a larger penalty. As illustrated in FIG. 3, the scaling value $w_q$ is applied to the training instance Q: Jared Pad Gilmore Girls.

The parameter d may be defined as follows:

$$d = \frac{\sum_{i}^{m} 1_{q_i \in H}}{m} \quad \text{Eq. (2)}$$

In Eq. (2), $1_{q_i \in H}$ may be an indicator operation measuring whether a query word $q_i$ is covered by dialogue history H, and m may be the query size. In some embodiments, to avoid false negative situations, words both in dialogue histories and queries may be lemmatized, and the operation words may be filtered before calculating the scaling values.

The loss operation for reconstructing the view of instance-level masking may be defined as follows:

$$L_{inst} = -w_q \cdot \sum_{i=1}^{m} \log P(q_i | H, q_1, \ldots, q_n; \theta) \quad \text{Eq. (3)}$$

The loss operation in Eq. (3) produces the value $L_{inst}$, which measures how closely a query word corresponds to the dialogue history H. The query word in Eq. (3) may correspond to a query that is generated after the instance-level masking operation 202A is performed.

To sufficiently leverage the training data instead of just ignoring the samples with small scaling values, the model may be trained with curriculum learning where the training objective is standard cross-entropy (CE) loss before being switched to the instance-level masking loss.

In some embodiments, instead of adjusting the weight for training objective at the instance level (coarse grain), 0/1 hard masking may be applied at the token level (e.g., fine grain) to each training instance. FIG. 3 illustrates a token-level masking 202B operation, where a model is trained to generate not only the gold query Q, but also a template T that is automatically composed from the gold query together as a concatenated sequence $\hat{Q}$. As an example, the template may be constructed by converting query tokens that are not covered by the corresponding dialogue context into a pre-defined "[MASK]" token. To make the template precise, consecutive "[MASK]" tokens may be merged into one "[MASK]" token. For the query Q and the corresponding template T=($t_1, \ldots, t_{m'}$), the loss operation may be defined as follows:

$$L_{token} = \\ -\sum_{i=1}^{m'} \log P(t_i | H, t_1, \ldots, t_{i-1}; \theta) - \sum_{j=1}^{m} \log P(q_j | H, T, q_1, \ldots, q_{j-1}; \theta) \quad \text{Eq. (4)}$$

The loss operation in Eq. 4 generates the value $L_{token}$, which includes a first operation in which the query token ($t_i$) is compared with the dialogue history (H), and a second operation in which the query word ($q_i$) is compared with the dialogue history (H) and the template (T). As illustrated in Eq. 4, the second operation is subtracted from the first operation.

As the template only contains tokens from the dialogue context (except for "[MASK]"), training a model to generate $\hat{Q}$ can enhance the model's ability to produce faithful queries with crucial concepts from the dialogue context.

The static views may be primarily based on empirical findings where common tokens between the gold query and dialogue context are likely to have more importance. However, after the static view pre-training, there may still be a mismatch between the overlapping spans and the actual important content. Furthermore, the over-diversity phenomenon may not only be confined to non-overlapping words. A reason for this mismatch may be that the current neural models are still incapable of fitting human annotations that may be highly flexible. This large gap between human annotations and model distribution may lead to degraded model performance. Therefore, in some embodiments, the model may be trained with dynamic views to bridge this gap.

In some embodiments, for each training instance, κ candidate queries may be acquired using a beam search (e.g., C={c_1, . . . , c_κ}), where each candidate query may be a dynamic view. The x-best queries may be selected to ensure coverage of the dynamic views. A view c_i may be sampled from all candidates according to the model distribution. A score of quality s_i may be calculated for the sampled view against the gold query Q using a scoring operation f (e.g., Unigram F1) as follows:

$$s\_i = f(c\_i, Q) \qquad \text{Eq. (5)}$$

Both K and the scoring operation f may be hyper parameters selected by development experiments. A standard reinforcement learning may be adopted to update the model with each dynamic view $c_i$. The loss for predicting the dynamic view may be defined as:

$$L_{dynamic} = -\gamma_i \sum_{j=1}^{m_{c_i}} \log p(c_{i,j} | H, c_{i,1}, \ldots, c_{i,j-1}; \theta), \qquad \text{Eq. (6)}$$

In Eq. (6), $c_{i,j}$ may be one of the $m_{c_i}$ tokens in view and $c_i$, and $\gamma_i$ may be the reward for view $c_i$ defined as:

$$\gamma_i = s_i - \frac{\sum_{j=1}^{K} s_j}{K} \qquad \text{Eq. (7)}$$

The loss operation in Eq. (6) produces the value $L_{dynamic}$, which measures how closely a candidate query word corresponds to the dialogue history H. Note that if κ=1, then define $\gamma_i = s_i$. Different from static views, training with dynamic views may help a model to differentiate the quality of queries generated from the model.

In some embodiments, the multi-view training process is performed in two main operations: pre-training and fine tuning. During pre-training, the training loss of one static view may be used to update the model. In the fine tuning stage, the training loss of reconstructing the dynamic view may be adopted. With respect to the static views, the dynamic view may better calibrate a model by examining the model's search space. However, the dynamic view may be more sensitive to model performance.

Figure 5:
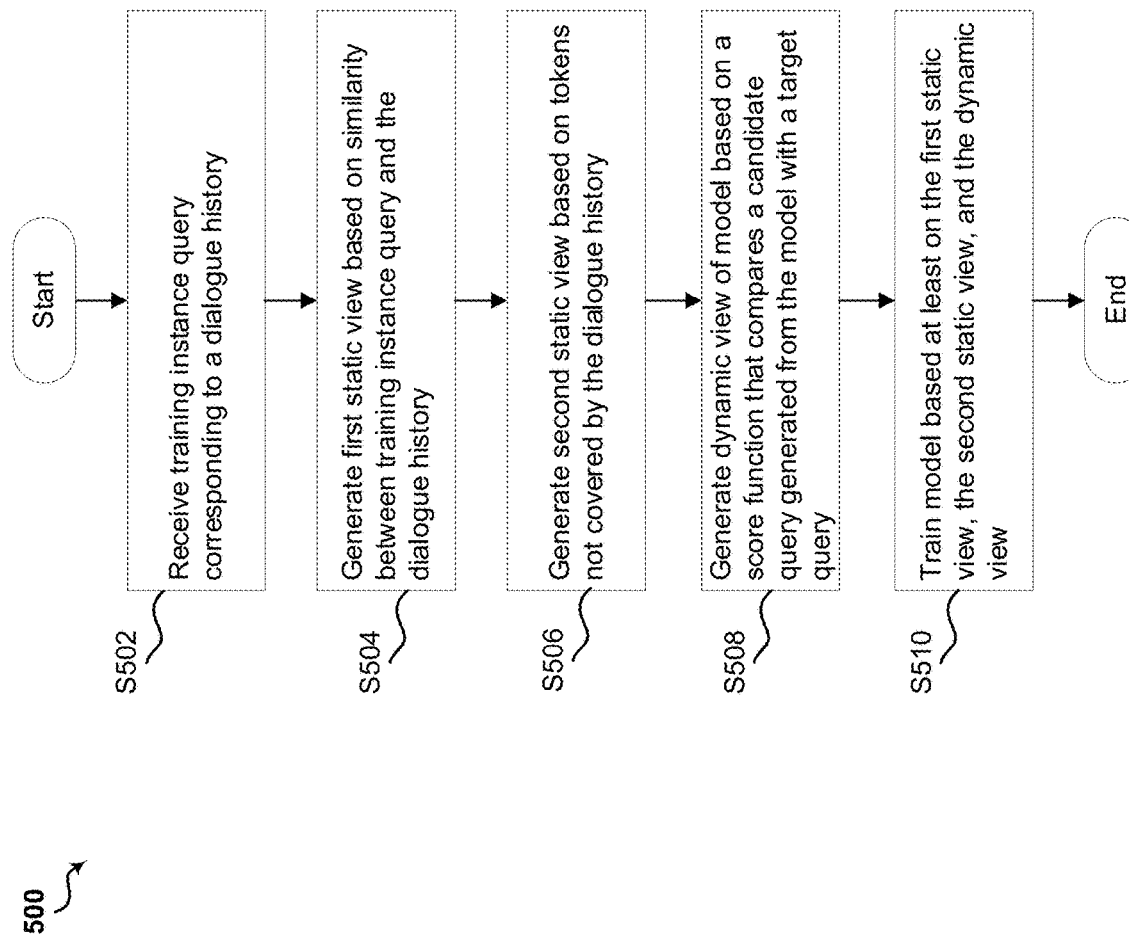
FIG. 5 is a flow chart of an example process for training a query generation model.

FIG. 5 illustrates a flow chart of an embodiment of a process 500 for training a query generation model. The process may start at operation S502 to receive a training instance query corresponding to a dialogue history. The process proceeds to operation S504 where a first static view of a query generation model is generated based on a similarity between the training query and the dialogue history. As an example, the instance-level masking operation 202A (FIG. 3) may be performed on the training instance query to generate the first static view.

Figure 4:
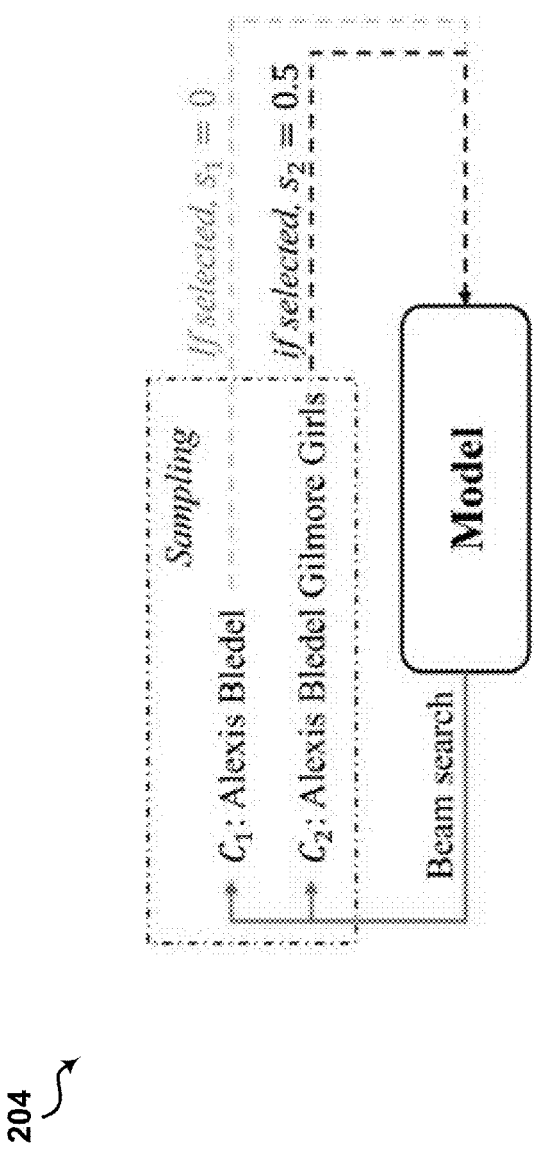
FIG. 4 is a block diagram of a dynamic view fine tuning of the query mode, in accordance with various embodiments of the present disclosure.

The process proceeds to operation S506 where a second static view of the query generation model is generated based on tokens not covered by the dialogue history. As an example, the token level masking operation 202B (FIG. 3) may be performed to generate the second static view of the query generation model. The process proceeds to operation S508 where a dynamic view of the query generation model is generated based on a score operation that compares a candidate query from the query generation model with a target query. As an example, the dynamic view fine tuning 204 (FIG. 4) may be performed to generate the static view of the query generation model. The process proceeds to operation S510 where the query generation model is trained based at least on the first static view, the second static view, and the dynamic view. For example, a loss operation is calculated for each view, and fed back into the model to train the model.

Table 1 illustrates example results on two data sets. The "Sum" column may correspond to a summation of accuracy. Unigram F1 and Bleu-1/2 scores may denote the overall result. The symbol ? denotes the results from a previously released model.

TABLE 1

|  | Wizard-of-Internet | | | |
| --- | --- | --- | --- | --- |
| Model | Acc. | Uni. F1 | BLEU-1/2 | Sum. |
| Blenderbot2† | 85.3 | 40.8 | 34.2/27.5 | 187.8 |
| Vanilla | 82.4 | 44.0 | 41.4/33.6 | 201.4 |
| $\mathcal{L}_{inst}$ | 85.3 | 45.6 | 43.5/34.9 | 209.3 |
| $\mathcal{L}_{token}$ | 85.4 | 45.8 | 42.4/34.8 | 208.4 |
| $\mathcal{L}_{dynamic}$ | 85.2 | 48.1 | 44.9/35.8 | 214.0 |
| $\mathcal{L}_{inst} \& \mathcal{L}_{dynamic}$ | 84.8 | 48.7 | 46.4/37.1 | 217.0 |
| $\mathcal{L}_{token} \& \mathcal{L}_{dynamic}$ | 85.7 | 48.8 | 45.6/36.4 | 216.5 |

The data in Table 1 may be based on the Wizard-of-Internet (WoI) dataset to validate the effectiveness and generalization of the embodiments of the present disclosure. Table 1 shows the overall results on Wizard-of-Internet, where BlenderBot2 represents a previous query generation model. BlenderBot2 may be based on BART-large and may be trained on the same data split as the systems in the embodiments of the present disclosure. Both the present model and the Vanilla model baseline may be based on T5-base [3], and thus, these models use smaller amounts of parameters than BlenderBot2 (220 M vs. 406 M). As illustrated in Table 1, among all models, the present model with $L_{inst}$ & $L_{dynamic}$ reaches best overall performance.

The foregoing disclosure provides illustration and description, but is not intended to be exhaustive or to limit the implementations to the precise form disclosed. Modifications and variations are possible in light of the above disclosure or may be acquired from practice of the implementations.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the operations specified in the flowchart and/or block diagram block or blocks. These computer readable program instructions may also be stored in a computer readable storage medium that can direct a computer, a programmable data processing apparatus, and/or other devices to operate in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the operations specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical operation(s). The method, computer system, and computer readable medium may include additional blocks, fewer blocks, different blocks, or differently arranged blocks than those depicted in the Figures. In some alternative implementations, the operations noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified operations or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code-it being understood that software and hardware may be designed to implement the systems and/or methods based on the description herein.

The above disclosure also encompasses the embodiments listed below:

(1) A method of training a model for query generation, the method performed by at least one processor and including: receiving a training instance query corresponding to a dialogue history; generating a first static view of the model based on a number of common words between the training instance query and the dialogue history; generating a second static view of the model based on one or more tokens not covered by the dialogue history, the one or more tokens corresponding to one or more query words; generating a dynamic view of the model based on a score operation that compares a candidate query generated from the model with a target query; and training the model based at least on the first static view, the second static view, and the dynamic view.

(2) The method of feature (1), in which generating the first static view includes: performing a first masking operation that applies a scaling value to the training instance query based on the number of common words between the training instance query and the dialogue history.

(3) The method of feature (2), in which the scaling value is a 0-1 scaling value determined based on (i) a faithfulness degree that provides a measure of similarity between the training instance query and the dialogue history and (ii) a parameter indicating a minimum value of the faithfulness degree such that a penalty is not applied to the scaling value.

(4) The method of any one of features (1)-(3), in which the generating the first static view includes determining a loss operation for predicting the first static view, in which the model is trained based on the loss operation for predicting the first static view.

(5) The method of any one of features (1)-(4), in which the generating the second static view includes generating a template by converting the tokens not covered by the dialogue history into a predefined mask token, in which the template is concatenated with the training instance query to generate a concatenated sequence.

(6) The method of feature (5), in which the generating the second static view further includes determining a loss operation for predicting the second static view based on the generated template, in which the model is trained based on the loss operation for predicting the second static view.

(7) The method of any one of features (1)-(6), in which the score operation is a Unigram F1 operation.

(8) The method of any one of features (1)-(7), in which the generating the dynamic view further includes determining a loss operation for predicting the dynamic view based at least on the score operation and the candidate query.

(9) A device for training a model for query generation, the device including: at least one memory configured to store computer program code; and at least one processor configured to access said at least one memory and operate as instructed by said computer program code, said computer program code including: receiving code configured to cause at least one of said at least one processor to receive a training instance query corresponding to a dialogue history; first generating code configured to cause at least one of said at least one processor to generate a first static view of the model based on a number of common words between the training instance query and the dialogue history; second generating code configured to cause at least one of said at least one processor to generate a second static view of the model based on one or more tokens not covered by the dialogue history, the one or more tokens corresponding to one or more query words; third generating code configured to cause at least one of said at least one processor to generate a dynamic view of the model based on a score operation that compares a candidate query generated from the model with a target query; and training code configured to cause at least one of said at least one processor to train the model based at least on the first static view, the second static view, and the dynamic view.

(10) The device of feature (9), in which first generating code further includes: performing code configured to cause at least one of said at least one processor to perform a first masking operation that applies a scaling value to the training instance query based on the number of common words between the training instance query and the dialogue history.

(11) The device of feature (10), in which the scaling value is a 0-1 scaling value determined based on (i) a faithfulness degree that provides a measure of similarity between the training instance query and the dialogue history and (ii) a parameter indicating a minimum value of the faithfulness degree such that a penalty is not applied to the scaling value.

(12) The device according to any one of features (9)-(11), in which the first generating code further includes determining code configured to cause at least one of said at least one processor to determine a loss operation for predicting the first static view, in which the model is trained based on the loss operation for predicting the first static view.

(13) The device according to any one of features (9)-(12), in which the second generating code further includes template generating code configured to cause at least one of said at least one processor to generate a template by converting the tokens not covered by the dialogue history into a predefined mask token, in which the template is concatenated with the training instance query to generate a concatenated sequence.

(14) The device of feature (13), in which the second generating code further includes determining code configured to cause at least one of said at least one processor to determine a loss operation for predicting the second static view based on the generated template, in which the model is trained based on the loss operation for predicting the second static view.

(15) The device according to any one of features (9)-(14), in which the score operation is a Unigram F1 operation.

(16) The device according to any one of features (9)-(15), in which the third generating code further includes determining code configured to cause at least one of said at least one processor to determine a loss operation for predicting the dynamic view based at least on the score operation and the candidate query.

(17) A non-transitory computer readable medium having instructions stored therein, which when executed by a processor cause the processor to execute a method of training a model for query generation, the method including: receiving a training instance query corresponding to a dialogue history; generating a first static view of the model based on a number of common words between the training instance query and the dialogue history; generating a second static view of the model based on one or more tokens not covered by the dialogue history, the one or more tokens corresponding to one or more query words; generating a dynamic view of the model based on a score operation that compares a candidate query generated from the model with a target query; and training the model based at least on the first static view, the second static view, and the dynamic view.

(18) The non-transitory computer readable medium of feature (17), in which generating the first static view includes: performing a first masking operation that applies a scaling value to the training instance query based on the number of common words between the training instance query and the dialogue history.

(19) The non-transitory computer readable medium of feature (18), in which the scaling value is a 0-1 scaling value determined based on (i) a faithfulness degree that provides a measure of similarity between the training instance query and the dialogue history and (ii) a parameter indicating a minimum value of the faithfulness degree such that a penalty is not applied to the scaling value.

(20) The non-transitory computer readable medium of feature (17), in which the generating the first static view includes determining a loss operation for predicting the first static view, in which the model is trained based on the loss operation for predicting the first static view.

What is claimed is:

1. A method of training a model for query generation, the method performed by at least one processor and comprising:
   receiving a training instance query corresponding to a dialogue history;
   generating a first static view of the model based on a number of common words between the training instance query and the dialogue history by performing a first making operation that applies a 0-1 scaling value to the training instance query based on the number of common words between the training instance query and the dialogue history, the 0-1 scaling value being a value between 0 and 1;
   generating a second static view of the model based on one or more tokens not covered by the dialogue history, the one or more tokens corresponding to one or more query words;
   generating a dynamic view of the model based on a score operation that compares a candidate query generated from the model with a target query; and
   training the model based at least on the first static view, the second static view, and the dynamic view.

2. The method of claim 1, wherein the 0-1 scaling value is determined based on (i) a faithfulness degree that provides a measure of similarity between the training instance query and the dialogue history and (ii) a parameter indicating a minimum value of the faithfulness degree such that a penalty is not applied to the 0-1 scaling value.

3. The method of claim 1, wherein the generating the first static view includes determining a loss operation for predicting the first static view, wherein the model is trained based on the loss operation for predicting the first static view.

4. The method of claim 1, wherein the generating the second static view includes generating a template by converting the tokens not covered by the dialogue history into a predefined mask token, wherein the template is concatenated with the training instance query to generate a concatenated sequence.

5. The method of claim 4, wherein the generating the second static view further includes determining a loss operation for predicting the second static view based on the generated template, wherein the model is trained based on the loss operation for predicting the second static view.

6. The method of claim 1, wherein the score operation is a Unigram F1 operation.

7. The method of claim 1, wherein the generating the dynamic view further includes determining a loss operation for predicting the dynamic view based at least on the score operation and the candidate query.

8. A device for training a model for query generation, the device comprising:
   at least one memory configured to store computer program code; and
   at least one processor configured to access said at least one memory and operate as instructed by said computer program code, said computer program code including:
      receiving code configured to cause the at least one processor to receive a training instance query corresponding to a dialogue history;
      first generating code configured to cause the at least one processor to generate a first static view of the model based on a number of common words between the training instance query and the dialogue history by performing a first making operation that applies a 0-1 scaling value to the training instance query based on the number of common words between the training instance query and the dialogue history, the 0-1 scaling value being a value between 0 and 1;
      second generating code configured to cause the at least one processor to generate a second static view of the model based on one or more tokens not covered by the dialogue history, the one or more tokens corresponding to one or more query words;
      third generating code configured to cause the at least one processor to generate a dynamic view of the model based on a score operation that compares a candidate query generated from the model with a target query; and
      training code configured to cause the at least one processor to train the model based at least on the first static view, the second static view, and the dynamic view.

9. The device of claim 7, wherein the 0-1 scaling value is determined based on (i) a faithfulness degree that provides a measure of similarity between the training instance query and the dialogue history and (ii) a parameter indicating a minimum value of the faithfulness degree such that a penalty is not applied to the 0-1 scaling value.

10. The device of claim 8, wherein the first generating code further includes determining code configured to cause the at least one processor to determine a loss operation for predicting the first static view, wherein the model is trained based on the loss operation for predicting the first static view.

11. The device of claim 8, wherein the second generating code further includes template generating code configured to cause the at least one processor to generate a template by converting the tokens not covered by the dialogue history into a predefined mask token, wherein the template is concatenated with the training instance query to generate a concatenated sequence.

12. The device of claim 11, wherein the second generating code further includes determining code configured to cause the at least one processor to determine a loss operation for predicting the second static view based on the generated template, wherein the model is trained based on the loss operation for predicting the second static view.

13. The device of claim 8, wherein the score operation is a Unigram F1 operation.

14. The device of claim 8, wherein the third generating code further includes determining code configured to cause the at least one processor to determine a loss operation for predicting the dynamic view based at least on the score operation and the candidate query.

15. A non-transitory computer readable medium having instructions stored therein, which when executed by a processor cause the processor to execute a method of training a model for query generation, the method comprising:

receiving a training instance query corresponding to a dialogue history;

generating a first static view of the model based on a number of common words between the training instance query and the dialogue history by performing a first making operation that applies a 0-1 scaling value to the training instance query based on the number of common words between the training instance query and the dialogue history, the 0-1 sealing value being a value between 0 and 1;

generating a second static view of the model based on one or more tokens not covered by the dialogue history, the one or more tokens corresponding to one or more query words;

generating a dynamic view of the model based on a score operation that compares a candidate query generated from the model with a target query; and training the model based at least on the first static view, the second static view, and the dynamic view.

16. The non-transitory computer readable medium of claim 15, wherein the 0-1 scaling value is determined based on (i) a faithfulness degree that provides a measure of similarity between the training instance query and the dialogue history and (ii) a parameter indicating a minimum value of the faithfulness degree such that a penalty is not applied to the 0-1 scaling value.

17. The non-transitory computer readable medium of claim 15, wherein the generating the first static view includes determining a loss operation for predicting the first static view, wherein the model is trained based on the loss operation for predicting the first static view.

* * * * *